(No Model.)
D. CONNER.
SHEPHERD'S CROOK.
No. 316,242. Patented Apr. 21, 1885.
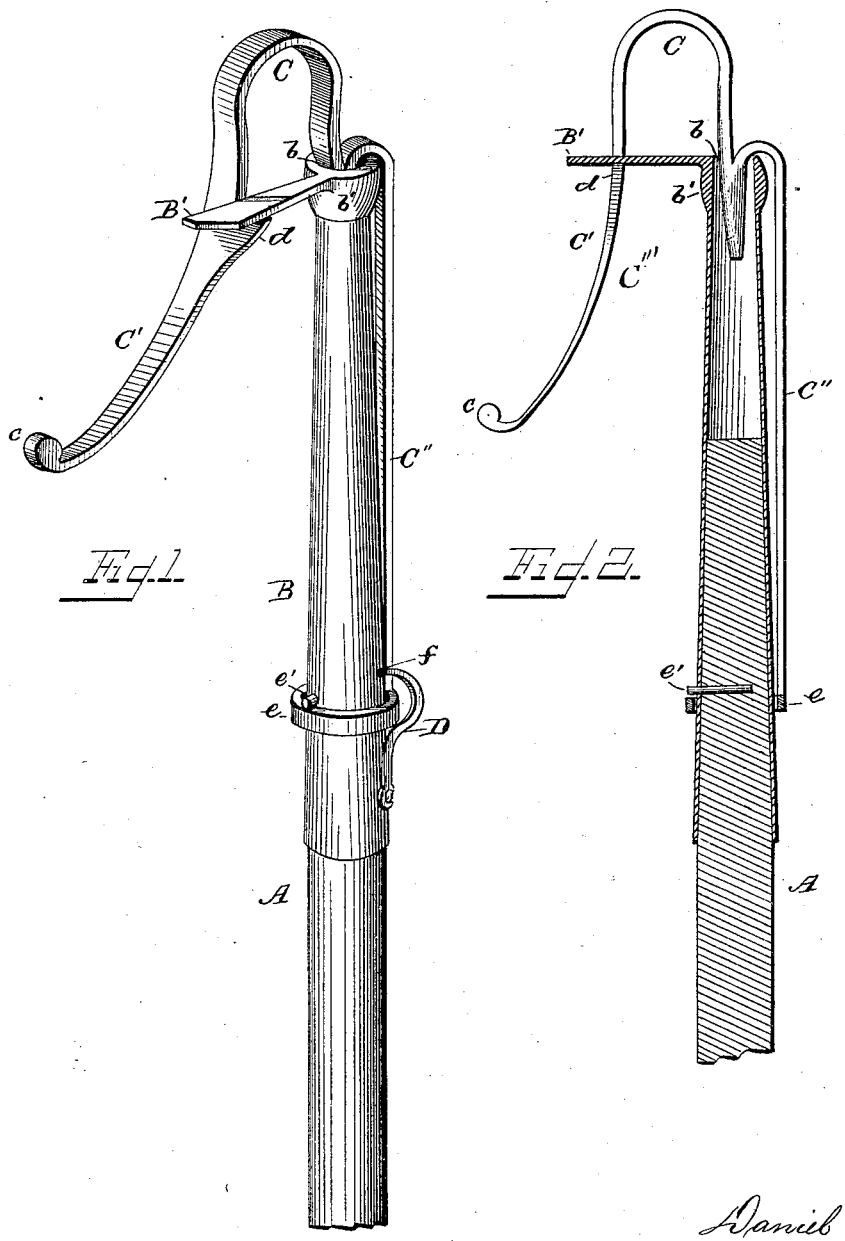

UNITED STATES PATENT OFFICE.

DANIEL CONNER, OF AMESVILLE, OHIO.

SHEPHERD'S CROOK.

SPECIFICATION forming part of Letters Patent No. 316,242, dated April 21, 1885.

Application filed May 8, 1884. (No model.)

*To all whom it may concern:*

Be it known that I, DANIEL CONNER, a citizen of the United States of America, residing at Amesville, in the county of Athens and State of Ohio, have invented certain new and useful Improvements in Shepherd's Crooks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to shepherd's crooks, its object being to provide a device by which an animal can be caught and securely held; and to this end the invention consists in providing a staff at one end with the hook, which is adapted to be movable in its bearings on the end of said staff in order that said hook may be moved to cause a lip thereon to engage a projection on said staff, and thus hold the hook in position.

In the accompanying drawings, Figure 1 is a perspective view illustrating my invention. Fig. 2 is a sectional view.

A represents a staff or rod, to one end of which is rigidly secured a ferrule, B, which is open at its upper end, as shown at $b$. The end of the ferrule B is enlarged, as shown at $b'$, and is provided with an outwardly-projecting arm, B', which engages with the notch portion of the crook. The crook C is preferably made of a single piece, and consists, essentially, of the hub $C^3$ and bent portions C' and $C^2$. The bent portion C' is provided on its outer extremity with ball $c$, and intermediately between its curved portion and end with a projection at right angles from the side thereof to form a notch for the projecting arm B' of the ferrule B.

The hub $C^3$ of the crook C enters the end of the ferrule, so as to be journaled therein, and the member $C^2$ being bent, as shown, extends downwardly parallel with the ferrule, and is provided at its lower end with a ring, $e$, which encircles the lower portion of the same.

The displacement of the hub $C^3$ is prevented by a pin, $e'$, which engages with the upper portion of the ring $e$, while a displacement in the opposite direction is prevented by an upper bend in the portion $C^2$, which lies over the upper or enlarged end of the ferrule. The projecting arm B' of the ferrule and the pin $e'$ are on the same vertical line and conjointly serve as stops.

The projecting arm B' limits the play or rotation of the crook C in one direction and the pin $e'$ in the other as the bent portions C and C' come in contact with these parts.

The lower portion of the ferrule, at a point above the ring $e$, is provided with a perforation, $f$, with which engages a hook, D, which is pivoted to the ferrule, as shown. The curved portion of the hook will extend over the ring $e$, and bear against the side of it on the portion $C^2$, and hold the same in a locked position, as shown in Fig. 1, thus preventing the rotation of the same.

The operation of the device is as follows: When it is desired to catch an animal, the hook D is opened or unlocked and the crook turned until the portion $C^2$ comes in contact with the pin $e'$, and when in this position is ready to be used as a catch device, and when the animal is caught, by turning the staff portion B' the ferrule will pass over the projection $d$ of the portion C', as hereinbefore described, and be locked from rotation by inserting the hook D in the perforation $f$.

I claim—

1. The improved shepherd's crook herein described, consisting of the staff having at its end a ferrule with a projecting arm, and a crook with a catch adapted to engage with the aforesaid projecting arm, and a hook to lock the ferrule and crook, substantially set forth.

2. The improved shepherd's crook consisting of the staff A, ferrule B, having a projecting arm, B', and perforation $f$, the crook C, having bent portion C', provided with the projection $d$, and the bent portion $C^2$, provided with a ring, $e$, the pin $e'$, and the hook D, substantially set forth.

3. In the shepherd's crook, the staff A, provided with the ferrule B, having an open end to the projecting arm B', formed thereon, in combination with a crook, C, having bent portion C', with the catch $d$, and bent portion $C^2$, having a ring formed at its lower end, retaining-pin $e'$, and locking-hook D, substantially as shown, and for the purpose set forth.

In testimony whereof I affix my signature in presence of two witnesses.

DANIEL CONNER.

Witnesses:
S. E. HEDGES,
I. H. LOVE.